Dec. 19, 1961  G. H. SCHULZ  3,013,823
SEAL
Filed March 10, 1958  2 Sheets-Sheet 1
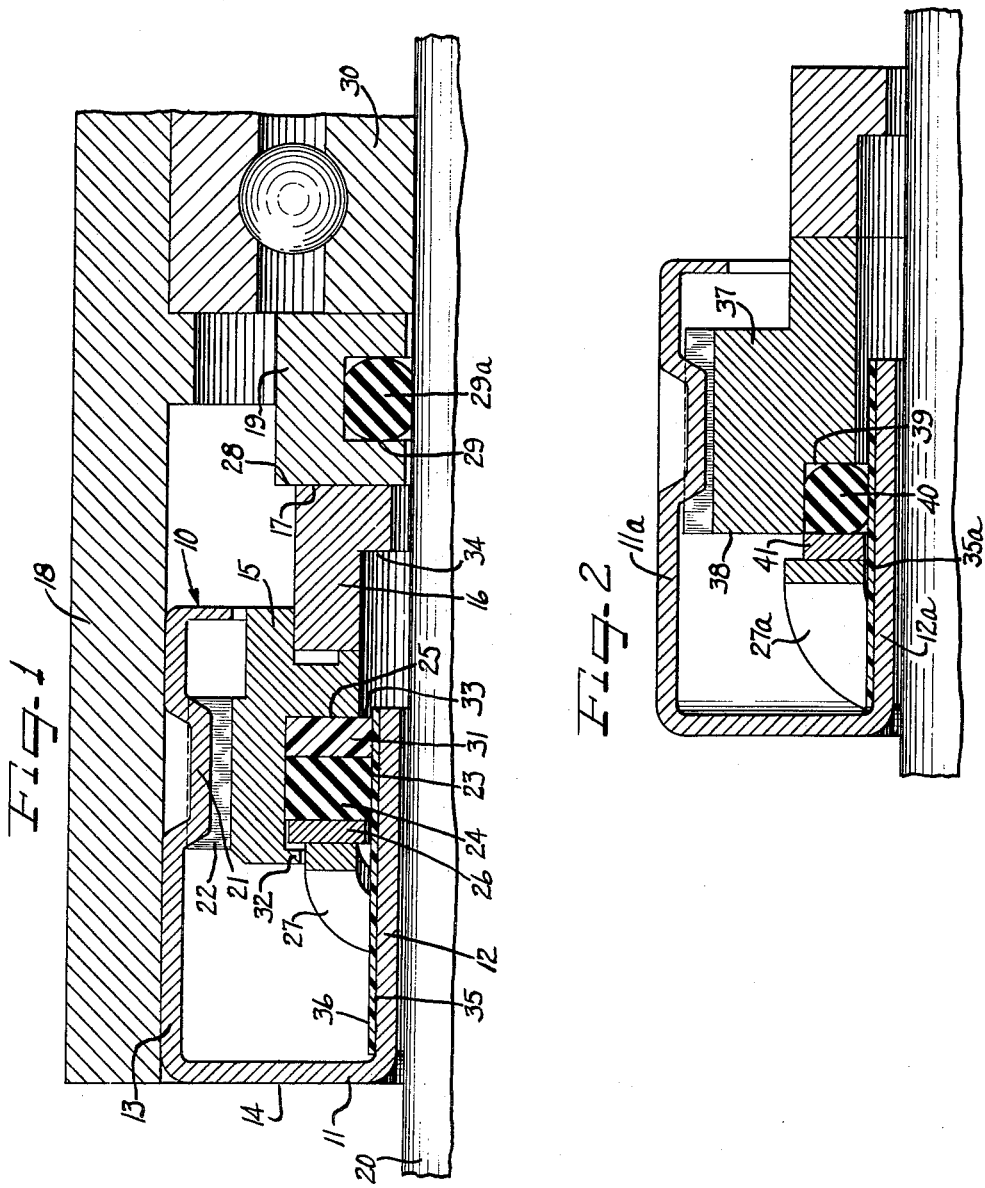
Inventor
George Henry Schulz
by Hill, Sherman, Meroni, Gross & Simpson Attys Dec. 19, 1961  G. H. SCHULZ  3,013,823
SEAL
Filed March 10, 1958  2 Sheets-Sheet 2
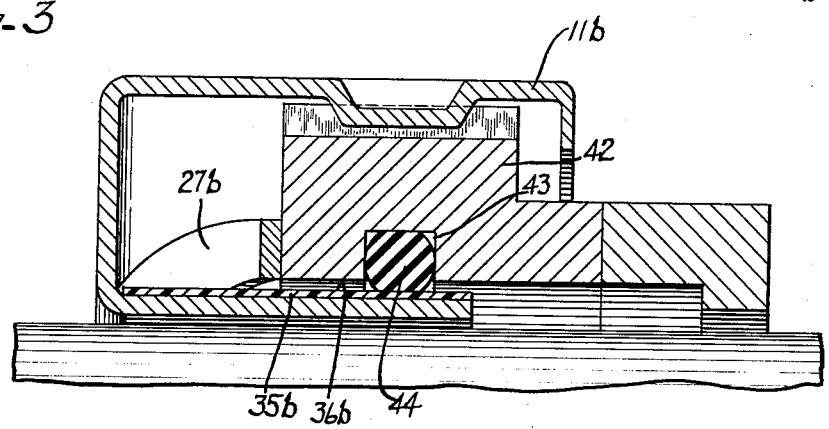
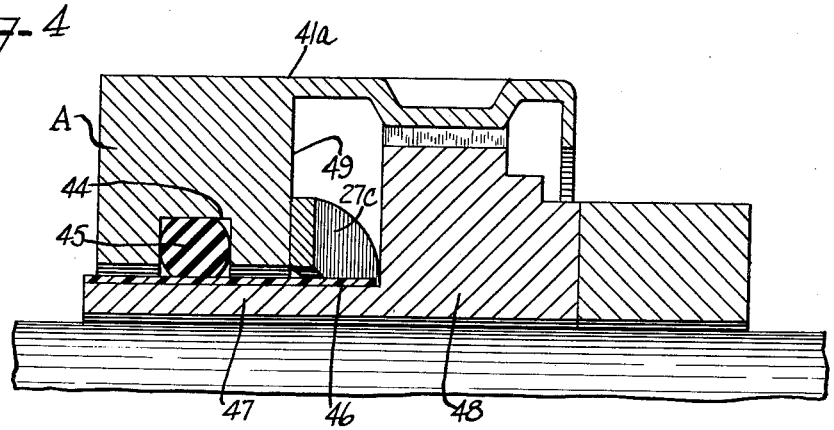
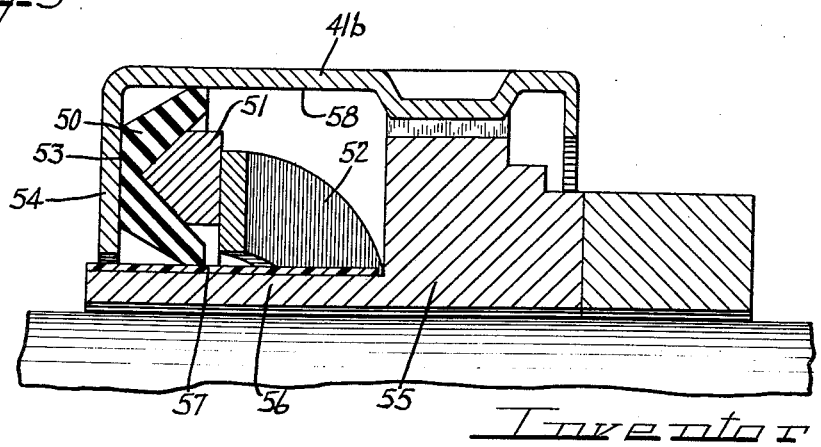
Inventor
George Henry Schulz
by Hill, Sherman, Meroni, Gross & Simpson Attys 3,013,823
SEAL
George Henry Schulz, Naperville, Ill., assignor to Gits
Bros. Mfg. Co., Chicago, Ill., a corporation of Illinois
Filed Mar. 10, 1958, Ser. No. 720,250
1 Claim. (Cl. 286—11.14)

This invention relates to a shaft seal for effecting a seal between a rotatable element and a stationary wall element so as to prevent communication between spaces on opposite sides of the wall element. In such a seal, a support member may be carried by one of the elements with a ring carried by the support member defining a sealing face adapted to coact with a sealing face on the other of the elements. In order to afford relative axial movement of the elements and compensate for wear of the sealing faces it is necessary to permit relative axial movement between the ring and the support member while maintaining a seal between the ring and the support member which is operative when fluid pressure on one side of the wall element is at a higher level than pressure on the other side thereof. Also the assembly should be efficient when fluids at a variety of temperatures and pressures are utilized.

In seal assemblies of the type described, there is a tendency for the sealing material to adhere to the metal, this tendency being more or less of a problem in accordance with the extent of factors such as the amount of interference between the surface of the metal and the surface being contacted, the finish of the contacting surfaces, the temperature of the assembly or of the liquids in contact with parts thereof and the like. This adherence interferes with the axial movement of the rubber sealing ring relative to the metal surface with which it is in sealing contact, which is required, as stated, in compensating for the wear in the sealing faces.

Heretofore, despite a great deal of effort, no headway has been made in overcoming this problem. For example, it has been proposed to compound anti-friction qualities into a synthetic rubber seal, and the use of various cross-sectional configurations for the rubber seal has also been attempted. These have not been satisfactory expedients, and the application of smooth finishes has not solved the difficulty because these either have insufficiently low coefficients of friction or are extremely subject to wear and abrasion.

It is the purpose of the present invention to overcome the tendency toward sticking and seizure of a rubber sealing element for use with a material to be sealed thereby, and to provide a sealing surface upon which the rubber or synthetic rubber seal may ride which has extremely tough and durable heat and oil resistant qualities affording a high degree of slipperiness or anti-friction characteristic.

Another object of the invention is to provide an improved shaft seal or the like having means for disposing a seal between a support member and a ring in a manner which affords ease of adjustment and freedom from seizure and sticking such as has heretofore been encountered.

Another object of the invention is to provide a seal assembly as described in which the sealing element may be maintained between a rotatable element and a stationary wall element or the like so as to prevent communication between spaces on opposite sides of the wall element and to provide an anti-friction coating according to the invention which is preferably disposed upon the said supporting element to afford continuous axial compensation.

Another object of the invention is to provide an improved shaft seal in which the coating is tetrafluoroethylene resin.

Other objects and advantages of the invention will become apparent as the description proceeds in accordance with the drawings in which:

FIGURE 1 is a cross-view taken through a portion of a shaft seal in accordance with the present invention;

FIGURE 2 is a sectional view through a portion of a modified form of a shaft seal according to the invention; and FIGURES 3 through 5 are further sectional views through still other modified forms of shaft seals constructed in accordance with the principles of this invention.

Referring now to FIGURE 1, the reference numeral 10 designates generally a preferred form of shaft seal in accordance with the invention. An annular cartridge-like support member or first element 11 is provided for the shaft seal 10 comprising an inner wall 12 and an outer wall 13 of substantially cylindrical configuration, joined by an annular radially extending wall 14. A support ring or second element 15 is disposed within the support member 11 and the walls 12 and 13 thereof, the support ring 15 having received therein an annular sealing element 16 having a sealing face 17. With the cartridge-like member 11 supported within a wall 18 or the like element, the sealing element 16 may engage a bearing 19 carried by shaft or element 20 rotatable relative to element 18 or, when the member 11 is disposed on a shaft, the sealing face 17 may engage a like sealing face carried by a wall element or the like.

The support ring 15 and the sealing ring 16 are adapted to move axially relative to the support member 11 so as to compensate for wear on the sealing face 17, and to permit relative motion of the parts of the assembly. In order to prevent or to limit rotation of the support ring 15 relative to the support member 11, the outer cylindrical wall 13 is deformed inwardly in circumferentially spaced points to provide ridges 21 and engage grooves 22 in the support ring 15.

In order to provide a seal between the support ring 15 and the support member 11, a packing assembly 23 is provided with a washer 24 of a flexible, resilient material such as natural rubber or synthetic rubber or the equivalent, disposed between an outer cylindrical surface of the wall 12 and an inner cylindrical surface of the support ring 15, as hereinafter further described. The washer 24 is also disposed between a radially extending annular surface 25 of the ring 15 and a washer 26 of metal or other relatively rigid material. A flat wave compression spring 27 is disposed between the wall 14 and the washer 26 so as to exert a compression force on the washer 24 and increase the pressure between the washer 24 and the wall 12. The compression spring 27 also acts to urge the main sealing face 17 into engagement with a like face, herein designated by reference numeral 28 and forming an end of the bearing 19, the bearing defining an annular recess 29 receiving an O-ring 29a which cooperates with the shaft 20 to provide an effective seal as urged against the surface 17 by a ball bearing 30.

An insulating ring or washer 31 is provided between the rubber washer 24 and the surface 25, and is preferably formed of a heat resistant elastomer which is not as resilient as rubber, so that the combination provides a highly efficient seal which can withstand the combined effects of a pressure differential in the fluid being sealed and the application of high temperatures.

The seal 10 is so constructed that it is efficiently operable irrespective of relative fluid pressures in the spaces on opposite sides of the seal between which the seal acts. In particular, an annular projection on the ring 15 is clinched over to provide a radially inwardly projecting annular flange 32 which limits movement of the washer 26, the purpose thereof being to prevent packing assembly 23 from being blown apart by high pressure on the side of the seal adjacent the element 16. Fluid on this side of the seal acts on a surface portion of the washer 31 to develop a force urging the washer away from the surface 28, and this force is opposed by the force exerted by the spring 27 and the force of the fluid pressure on the opposite side of the seal against the washer 26 and the exposed surface portions of the washer 24. Flange 32 acts as a stop for the washer 26 so that the force exerted by the fluid under pressure against the washer 31 will squeeze the washer 24 between the washers 26 and 31 and thus maintain the seal. In accordance with the invention, sufficient pressure is maintained between the sealing surface 17 and the surface 28 with which it is in contact to maintain a seal irrespective of the relative fluid pressures spaced on opposite sides thereof. In particular, fluid under pressure on one side of the seal acts against the surface 33 of the washer 31 to produce a force urging the sealing face 17 away from the surface with which it is engaged. Sealing ring 16 is preferably formed to provide a surface 34 facing in the direction opposite to the surface 33 so that fluid under pressure against the surface 34 will develop a force urging sealing face 17 into higher pressure engagement with the surface 28. The surface 34 is preferably substantially greater in area than the surface 33 so that an increase in the fluid pressure on the said one side of the seal will increase the pressure at the sealing face 17.

It will thus be seen that relative axial adjusting movement of the seal assembly 23 is a feature of seals of this construction and in order to prevent sticking, binding or seizure of the sealing elements of the assembly 23 against the wall 12, as heretofore encountered, a coating designated generally by reference numeral 35 is integrally bonded with the wall 12 to provide a smooth finished surface 36 in accordance with the invention. This coating is formed of tetrafluoroethylene, which is sold under the trademark "Teflon" as a product of the Du Pont de Nemours Company. The coating 35 is applied in the following manner. The surface of the wall 12 to be coated should preferably be machined or ground to a finish of 32 micro inches or less. This smooth finished surface may be prepared for coating by cleaning with a dilute solution of phosphoric or chromic acid and suitably rinsing it thereafter. The Teflon is then sprayed on the surface 22 preferably in the form of a one coat enamel to a thickness of .2 mil to .4 mil. The coating is air dried or oven dried at a temperature below 200° F. until medium brown in color and then baked at substantially 750° F. until sintered. Further procedures may be utilized in accordance with the understanding of those skilled in the art. However, the surface thus produced is highly slippery having a kinetic coefficient of friction in the neighborhood of .1 or less.

Referring now to FIGURE 2, a second embodiment of the invention is shown, in which the cartridge 11a contains a support ring 37 whose inner end 38 defines an annular recess 39 for receiving an O-ring 40 of synthetic material, a washer 41 of metal or other relatively rigid material being provided to receive pressure from the spring 27a in the manner hereinbefore described. The cross-section of the ring 40 may be varied as desired and in order to afford a sliding leakproof fit therewith, a coating 35a of tetrafluoroethylene is bonded onto the wall 12a so that the surface 36a thereof provides substantially abrasion-free relative axial movement for the ring 37.

Yet other embodiments of the invention are shown in FIGURES 3–5, the embodiment of FIGURE 3 providing a support ring 42 in the cartridge 11b, which defines an annular recess 43 intermediate the ends thereof in which an O-ring 44 is received and rides in sealing relation on the coating 35b and surface 36b as described in the preceding form of the invention. The spring 27b is thus enabled to coact with the support ring 42 without a washer such as the washer 41 in FIGURE 2.

In FIGURE 4, an outer cartridge 41a has a thickened end A which defines a groove 44 for receiving an O-ring or the like 45, as described, and in this embodiment the tetrafluoroethylene coating 46 is bonded to a sleeve 47 which is integrally formed with the support ring 48 in underlying relationship to the thickened portion A of the cartridge. The spring 27c thus acts directly on the inner face 49 of the portion A, the support ring 48 otherwise being formed as hereinabove set forth and adapted to slide smoothly on the coating 46.

A similar construction for the support ring is shown in FIGURE 5, wherein a cartridge 41b of substantially cup-shaped configuration cooperates with a sealing element or ring 50 in the shape of a chevron cross-sectionally, a pressure ring 51 of complementary configuration being urged against the element 50 by a spring 52 so that the outer face 53 of the element 50 tends to engage the end wall 54 of the cartridge. It will be understood, however, that other shapes may also be provided for the element 50. The spring 52, the support ring 55 and the elements 50 and 51 are all contained in the cartridge 41b, while the extension or sleeve 56 of the support ring 55 carries an integrally bonded coat 57 of tetrafluoroethylene as hereinabove described. It is, however, also within the scope of the invention to coat the cylindrical wall 58 of the cartridge in a similar manner.

There has thus been provided a shaft seal which is tough and durable, which reduces frictional drag between the parts to a minimum and prevents the sticking and seizure which are produced in conventional structures. Because a thin molecular film tends to form on the seal ring in contact with the coating of the invention, the coefficient of friction may actually be reduced during continued use, and there will be substantially no need for replacement of parts.

Although I have herein set forth and described my invention with respect to certain specific principles and details thereof, it will be understood by those skilled in the art that these may be modified in accordance with the understanding of those skilled in the art except as set forth in the hereunto appended claim.

I claim as my invention:

In a shaft seal, a member having a cylindrical wall adapted to surround a shaft, a ring having at least a portion thereof surrounding said wall, said portion of said ring surrounding said wall being radially spaced from said wall to form an annular recess in cooperation with said wall, said ring having a backing shoulder formed at one end of said recess, a coating formed in integrally bonded relationship on said wall adjacent said recess and adjacent said ring, said coating having a thickness of from .2 to .4 mils and a coefficient of friction in the neighborhood of .1, a first insulating annulus abutting said shoulder, said ring and said coating, a second annulus abutting said first annulus, said ring and said coating, said first annulus being formed of resilient material, said second annulus being formed of resilient material, said first annulus having a lesser resiliency than said second annulus and having a high degree of heat resistance to withstand fluid pressures thereagainst, a metal washer disposed in said recess in abutting relationship to said second annulus and having an inner diameter greater than the diameter of said wall, and means for exerting axial force through said washer, said first annulus and said second annulus to produce radial sealing force between said first annulus and said second annulus and said coating, so that slidable adjustment of said first and second annuli, and said wall, is afforded with a highly effective sealing action being maintained therebetween.

References Cited in the file of this patent

UNITED STATES PATENTS

| | | |
|---|---|---|
| 2,504,937 | Dayne | Apr. 18, 1950 |
| 2,505,189 | Krug | Apr. 25, 1950 |
| 2,647,774 | Newberry | Aug. 4, 1953 |
| 2,807,511 | Fleming | Sept. 24, 1957 |
| 2,844,393 | Jensen | July 22, 1958 |

FOREIGN PATENTS

| | | |
|---|---|---|
| 205,228 | Australia | Jan. 3, 1957 |